United States Patent [19]

Landingham et al.

[11] Patent Number: 4,704,338

[45] Date of Patent: Nov. 3, 1987

[54] STEEL BONDED DENSE SILICON NITRIDE COMPOSITIONS AND METHOD FOR THEIR FABRICATION

[75] Inventors: Richard L. Landingham, Livermore; Thomas E. Shell, Tracy, both of Calif.

[73] Assignee: The United States of America as represented by the United States Department of Energy, Washington, D.C.

[21] Appl. No.: 932,552

[22] Filed: Nov. 20, 1986

Related U.S. Application Data

[62] Division of Ser. No. 736,024, May 20, 1985, abandoned.

[51] Int. Cl.$^4$ .................. B32B 15/04; B32B 15/01; B32B 15/18
[52] U.S. Cl. .................. 428/627; 428/679; 428/680
[58] Field of Search ........... 428/627, 680, 679, 678, 428/675, 677, 673, 614

[56] References Cited

U.S. PATENT DOCUMENTS

| | | | |
|---|---|---|---|
| 2,972,808 | 2/1961 | Litton | 228/124 |
| 3,915,369 | 10/1975 | Schmidt-Bruecken et al. | 228/198 |
| 4,055,451 | 10/1977 | Cockbein et al. | 29/469.5 |
| 4,131,459 | 12/1978 | Fletcher et al. | 264/60 |
| 4,263,353 | 4/1981 | Patel | 427/423 |
| 4,293,619 | 10/1981 | Landingham et al. | 357/67 |
| 4,325,647 | 4/1982 | Maier et al. | 403/29 |
| 4,343,865 | 8/1982 | Graham | 428/552 |
| 4,347,089 | 8/1982 | Loehman | 65/36 |
| 4,394,170 | 7/1983 | Sawaoka | 75/233 |
| 4,404,262 | 9/1983 | Watmough | 428/539.5 |
| 4,469,658 | 9/1984 | Kimura | 419/7 |
| 4,470,537 | 9/1984 | Diem et al. | 228/193 |
| 4,492,737 | 1/1985 | Conolly | 428/552 |
| 4,505,418 | 3/1985 | Neidig et al. | 228/122 |
| 4,553,472 | 11/1985 | Munro et al. | 29/156.5 R |
| 4,614,689 | 9/1986 | Ikeda et al. | 427/299 |
| 4,626,451 | 12/1986 | Tanaka et al. | 427/123 |

FOREIGN PATENT DOCUMENTS

| | | | |
|---|---|---|---|
| 500750 | 3/1954 | Canada | 228/124 |
| 556614 | 4/1958 | Canada | 228/124 |
| 2534777 | 3/1976 | Fed. Rep. of Germany | 228/124 |
| 152275 | 8/1984 | Japan | 228/124 |

OTHER PUBLICATIONS

Metals Handbook, 8th Edition, vol. 1, p. 30, 1961.
R. L. Landingham and T. E. Shell, "Bonding Dense $Si_3N_4$ Components to Steel for Elevated-Temperature Cycling Applications", UCRL-90188, Lawrence Livermore National Laboratory, Livermore, Calif., 94550, Draft, 9/20/84.
R. L. Landingham and T. E. Shell, Extended Abstract, 6/8/84.
R. L. Landingham and T. E. Shell, Abstract, 1/6/83.
S. A. Huffsmith and R. L. Landingham, "Pressure Bonding Molybdenum Alloy (TZM) to Reaction-Bonded Silicon Nitride", UCID-17805, Lawrence Livermore National Laboratory, Livermore, Calif., 94550, 6/8/84.
Ceramic Age, "High Temperature Metal Ceramic Seals", p. 15, Apr. 1954.

*Primary Examiner*—Nicholas P. Godici
*Assistant Examiner*—Samuel M. Heinrich
*Attorney, Agent, or Firm*—Shyamala T. Rajender; L. E. Carnahan; Judson R. Hightower

[57] ABSTRACT

A two-stage bonding technique for bonding high density silicon nitride and other ceramic materials to stainless steel and other hard metals, and multilayered ceramic-metal composites prepared by the technique are disclosed. The technique involves initially slurry coating a surface of the ceramic material at about 1500° C. in a vacuum with a refractory material and the stainless steel is then pressure bonded to the metallic coated surface by brazing it with nickel-copper-silver or nickel-copper-manganese alloys at a temperature in the range of about 850° to 950° C. in a vacuum. The two-stage bonding technique minimizes the temperature-expansion mismatch between the dissimilar materials.

12 Claims, No Drawings

STEEL BONDED DENSE SILICON NITRIDE COMPOSITIONS AND METHOD FOR THEIR FABRICATION

This is a division of application Ser. No. 736,024 filed May 20, 1985, now abandoned.

BACKGROUND OF THE INVENTION

The present invention relates generally to ceramic and metal composites and more specifically to silicon nitride- metal composites.

The U.S. Government has rights in this invention pursuant to Contract No. W-7405-ENG-48 between the U.S. Department of Energy and the University of California, for the operation of Lawrence Livermore National Laboratory.

It has long been recognized that a combination of the heat and corrosion resistant properties of ceramics, with the heat condition and durability of metals, would be highly desirable for many applications such as for instance, in internal combustion engines and in other energy conversion systems. In recent years, therefore, cermets, which are composites of ceramics and metals, have been widely researched for use as high temperature, corrosion-resistant and high strength component materials in rocket nozzles, gas turbines, high temperature furnaces, helical expanders and the like. Silicon nitride-based ceramic materials are being considered for use in Sterling engines and high temperature diesel engines. A strong, thermally stable bond between the two dissimilar materials, ceramics and metals, is, however, difficult to achieve because of the brittleness and the low coefficient for thermal expansion of the ceramics. Various techniques for bonding these ceramic materials with metals or other ceramics have been widely and extensively investigated, to increase the utility of these ceramic-metal composites for high temperature uses.

U.S. Pat. No. 4,347,089 issued to Loehman discloses a method for bonding silicon nitride materials using silicon oxynitride.

U.S. Pat. No. 4,469,658 issued to Kimura et al., describe sintered silicon carbide composites containing Fe, Ni or Co.

U.S. Pat. No. 4,505,418 issued to Neidig et al., discloses a method for directly bonding copper foils to ceramic substrates.

U.S. Pat. No. 4,055,451 issued to Cockbain et al., teaches composite ceramic-metal or ceramic-ceramic, and a method for fabricating the same.

U.S. Pat. No. 4,492,737 issued to Connolly, discloses a composite consisting of a ceramic and a metallic component.

U.S. Pat. No. 4,293,619 issued to Landingham et al., teaches a composite which includes silicon nitride, a refractory metal and a layer of $MoSi_2$, and a method for making the same. The method essentially consists of contacting as a bonding agent, a layer of $MoSi_2$ with a portion of the silicon nitride substrate and with a portion of the refractory metal substrate, heating the $MoSi_2$ layer to a temperature of about 1000° C. to about 1300° C., and simultaneously with the heat, compressing the silicon nitride and refractory metal layers at pressures in excess of about 30 MPa. The metals used are molybdenum, titanium and zirconium.

U.S. Pat. No. 4,131,459 issued to Fletcher et al., discloses cermet compositions suitable as high temperature resistant refractory coatings on molybdenum and tungsten substrates.

U.S. Pat. No. 4,325,647 issued to Maier et al., describes ceramic-metal composite with a connecting element consisting of an insulating, resilient body of a ceramic material.

U.S. Pat. No. 4,470,537 issued to Diem et al., teaches a solid state method for bonding ceramic and metal parts.

A sintered composite of boron nitride and a metal and a method of making the composite is taught in U.S. Pat. No. 4,394,170 issued to Sawaoka et al.

U.S. Pat. No. 4,404,262 issued to Watmough, describes a method for making a composite of a ceramic material and a metallic component.

Thus, in spite of a great deal of activity in this area, current techniques for bonding metals to ceramic materials have not been very successful in producing strong, heat and corrosion resistant, machinable composites, particularly involving hard metals like iron and steel. The composites produced by these prior art methods are usually brittle and nondeformable and therefore, break down under thermal cycling. These difficulties stem mainly from a mismatch in their thermal expansion properties and from the great differences in other physical and chemical properties such as in the coefficients for thermal conductivity and expansion between the dissimilar metals and the ceramic materials.

Accordingly, it is an object of the present invention to provide a ceramic-metal composite whwich exhibits low expansion and high temperature bonding.

Another object of the invention is to provide a multi-layered silicon nitride-stainless steel composite.

Yet another object is to provide a bond of a metal shaft, more specifically a stainless steel shaft, to a ceramic turbine rotor.

Still another object is to provide a two stage technique for creating a strong ceramic-metal bond.

Additional objects, advantages and novel features of the invention, together with additional features contributing thereto and advantages accruing therefrom will be apparent from the following description and the accompanying illustration of an embodiment of the invention and the description of the fabrication technique therefor, as described hereinafter. The objects and advantages of the invention may be realized and attained by means of the instrumentalities and combinations particularly pointed out in the appended claims.

SUMMARY OF THE INVENTION

In accordance with the foregoing objects, one aspect of the present invention provides, broadly, a two-stage diffusion bonding technique for generating a strong bond between a high density ceramic material, such as silicon nitride, preferably sintered, high density silicon nitride that has been doped with yttrium oxide and aluminum oxide, and a hard metal such as stainless steel and multilayered ceramic-metal composites prepared in accordance with the technique. The two-stage bonding technique, broadly, utilizes multilayer bonding to reduce the stresses generated by the large mismatch in the thermal expansion properties of the two dissimilar materials during temperature cycling. The method involves initially slurry coating one or more surfaces of the ceramic material, more specifically high density, sintered silicon nitride, at about 1500° C., and in a vacuum, with a refractory or metallic material such as powdered nickel, molybdenum, molybdenum silicide and/or mixtures thereof. A metal, such as stainless steel, is then pressure bonded in a vacuum to the metallic coated surface by brazing it with a metal alloy such as nickel-copper-silver (Ni-Cu-Ag), nickel-copper-manganese (Ni-Cu-Mn), nickel-copper-palladium (Ni-Cu-Pd), nickel-copper-gold (Ni-Cu-Au), titanium-copper-nickel (Ti-Cu-Ni) and the like, at a temperature in the preferred range of about 850° to 930° C. The two-stage bonding technique minimizes the temperature-expansion mismatch between the dissimilar materials and preserves the mechanical properties of the steel.

Another aspect of the subject invention provides a ceramic-metal composite, such as for example, a multi-layered silicon nitride-stainlesss steel or other similar composites, by the present two-stage bonding technique.

The multilayered ceramic-metal composites of the subject invention are strongly bonded and are heat and corrosion resistant and are useful in the fabrication of ceramic turbine systems where a metal shaft is required to be bonded to a ceramic turbine rotor. The instant composites are useful in the fabrication of silicon nitride rotors to steel shafts for turbine, air compressor and Stirling diesel engines and turbines for jets and for other similar applications. The composites are also useful in the fabrication of other machine parts, tools and other laminates where hardness, heat resistance and corrosion resistance, particularly in situations where the combination of the heat, wear and erosion resistance of the ceramic material and the durability and workability of the metal are desired or required.

DETAILED DESCRIPTION OF THE INVENTION

One aspect of the subject invention is broadly directed to a multilayered ceramic-metal composite for use in turbine, air compressor and diesel engines and for other applications, where a strong, thermal and shear resistant ceramic-metal bond is desired. Another aspect of the present invention deals with a two-stage diffusion bonding technique for the fabrication of the ceramic-metal composite with the requisite characteristics of hardness, heat and corrosion resistance, durability and workability. Ceramic materials most suited for the technique of the present invention include but are not limited to silicon nitride, silicon carbide, titanium carbide, titanium nitride, tungsten carbide, titanium boride, and the like. The ceramic material is, preferably, sintered, of high density—almost fully dense—and may be doped with materials like yttrium oxide, aluminum oxide, cobalt, nickel and the like. Preferred ceramic materials are silicon carbide, tungsten carbide and silicon nitride, dense, sintered silicon nitride being the most preferred. Lower density ceramics such as reaction bonded silicon nitride (RBSN) can also be used but these ceramics generally yield products of lower strength than sintered, hot pressed or hot isostatically pressed ceramics.

The two-stage bonding technique involves the initial step of melt-coating or slurry coating at elevated temperatures, in a vacuum, a refractory or metallic material, on one or more surfaces of the dense, sintered ceramic material. Suitable refractory and/or metallic materials evaluated for this purpose include but are not limited to molybdenum, nickel, silicon, molybdenum silicide and mixtures thereof. Table I presents the compositions and method of preparation of some of the refractory materials so tested.

TABLE I

COMPOSITION AND PREPARATION OF SLURRY COATINGS

| Coating | Wt % | Preparation |
|---|---|---|
| Mo—Si Slurry: | | |
| 99.8% Mo powder (−200 mesh)[a] | 63.0 | Ball milled in wC mill with wC balls for 21 hrs in toluene to reduce powder size distribution |
| 99.99% Si powder (−35 mesh)[a] | 37.0 | |
| Mo—Si—Ni Slurry: | | |
| Mo—Si Slurry Coating | 50.0 | Alcohol slurry mixed in steel mills for 30 min. No reduction of powder size distribution |
| 99+% Ni powder (−325 mesh)[b] | 50.0 | |
| Mo—Si$_2$—Ni Slurry: | | |
| 99+% NiSi$_2$ powder (−200 mesh)[c] | 50.0 | Alcohol slurry mixed in steel mills for 30 min. No reduction of powder size distribution |
| 99+% Ni powder (−325 mesh)[b] | 50.0 | |

[a]Cerac product;
[b]Matheson Coleman Bell Product;
[c]Alpha product

A mixture of nickel and molybdenum silicide was found to be the most suitable refractory material and was the one of choice. The slurry coating is carried out in vacuum at a temperature in the range of from about 1200° to 1800° C., about 1500° C. being preferred. In the second step or stage, the metallic coated ceramic surface is pressure bonded to a piece of a hard metal such as any type of stainless steel, iron, copper, brass, tantalum, niobium, titanium and the like, by brazing in a vacuum, using a relatively low temperature metal alloy braze, in the temperature range of from about 800° to about 1000° C., preferably, 850° to 950° C., most preferably about 860° to 930° C., and a pressure range of about 50 to 1000 psi. Suitable brazing alloys include but are not limited to nickel-copper-silver (Nicusil 8), nickel-copper-manganese (Nicuman 37), nickel-copper-palladium, palladium-copper-silver (Palcusil 10), titanium-copper-nickel (Ticuni), nickel-copper-gold and the like. The compositions, solidus/liquidus temperatures and forms of some of the brazing alloys that were tested is given in Table II.

Although all the brazing alloys tested were satisfactory, nickel-copper-silver and nickel-copper-manganese were the preferred brazing alloys at the temperatures utilized, Ni-Cu-Ag being the most preferred.

TABLE II

COMPOSITIONS AND SOLIDUS/LIQUIDUS TEMPERATURES OF BRAZING ALLOYS

| Trade Name[a] | Composition wt % | | | | | | Temperature C. | | Form |
|---|---|---|---|---|---|---|---|---|---|
| | Ni | Cu | Ag | MN | Pd | Ti | Solidus | Liquidus | |
| Palusil 10 | — | 32 | 58 | — | 10 | — | 824 | 852 | 3 mil foil |
| Ticuni | 15 | 15 | — | — | — | 70 | 771 | 960 | −200 mesh powder |
| Nicusil 8 | 2 | 42 | 56 | — | — | — | 771 | 893 | −200 mesh |

TABLE II-continued
COMPOSITIONS AND SOLIDUS/LIQUIDUS TEMPERATURES OF BRAZING ALLOYS

| Trade Name[a] | Composition wt % | | | | | | Temperature C. | | Form |
|---|---|---|---|---|---|---|---|---|---|
| | Ni | Cu | Ag | MN | Pd | Ti | Solidus | Liquidus | |
| (AMS-765) | | | | | | | | | powder |
| Nicuman 37 | 9.5 | 52.5 | — | 38 | — | — | 880 | 925 | −200 mesh |
| (ASM-4764) | | | | | | | | | powder |

[a]All braze material was supplied by GTE, Westgo Div.

Many types and compositions of stainless steel and other hard metals may be employed in the present invention. Greek Ascaloy (Unitemp 1415Nw) was preferred for some of the experimental results reported because of its high temperature resistance and high stress resistance levels. The compositions and properties of the Greek Ascaloy used in the examples presented are given in Table III.

TABLE III
COMPOSITION AND PROPERTIES OF GREEK ASCOLOY (Unitemp 1415NW)

| | Composition | |
|---|---|---|
| Element | Typical | Actual (Heat No. 1G3046) |
| Carbon | 0.15 | 0.20 |
| Manganese | 0.40 | 0.37 |
| Silicon | 0.30 | 0.35 |
| Chrominum | 13.00 | 12.44 |
| Nickel | 2.00 | 1.96 |
| Tungsten | 3.00 | 2.66 |
| Sulfur | — | 0.01 |
| Phosphorus | — | 0.02 |
| Iron | Rem | Rem |

Elastic Modulus And Thermal Expansion:

| Temperature °F. | Elastic Modulus $10^6$ psi | Thermal Expansion Coefficient $10^6$ in./in. °F. |
|---|---|---|
| 80 | 28.5 | 5.9 |
| 200 | 28.0 | 6.0 |
| 600 | 26.0 | 6.12 |
| 1200 | 23.0 | 6.88 |

Hardness: 48 $R_c$ or 260/285 BHN
(Spec. AMS - 5616F - 1750F min oil).

There are several considerations in the choice of the ceramic material and the metal for the fabrication of the present composites. The thermal mismatch between the ceramic and the metal at the interface must be accommodated by the gradient region of infiltration. The major bonding force should be the diffusion of the metal into the dense ceramic and the reaction between the two at the interface rather than a mechanical bond on the rough or porous surfaces as in the case of some prior art methods. Infiltration of stainless steel into a porous ceramic surface would destroy the desirable properties of the steel and cause undesirable phases to form between the ceramic and the steel which would collapse on cooling on during thermal cycling.

In one preferred embodiment of the subject invention, the dense silicon nitride ($Si_3N_4$), which is sintered, hot pressed or isostatically pressed, is preferably doped with yttrium oxide ($Y_2O_3$) and aluminum oxide ($Al_2O_3$). One or more surfaces or portions thereof for bonding are initially prepared by diamond polishing to enhance the wetting properties. The properties of the sintered, dense silicon nitride suitable for use in the present invention are given in Table IV.

TABLE IV
PROPERTIES OF SINTERED $Si_3N_4$
(doped with $Y_2O_3$ and $Al_2O_3$)

Effect Of Stress Level On Failure:

| Probability Of Failure | Stress (psi) | Probability Of Failure | Stress (psi) |
|---|---|---|---|
| 0.1 | 64,500 | $10^{-4}$ | 38,810 |
| 0.01 | 54,330 | $10^{-5}$ | 32,800 |
| 0.001 | 45,930 | $10^{-6}$ | 27,730 |

Elastic Modulus And Thermal Expansion:

| Temperature °F. | Elastic Modulus $10^6$ psi | Thermal Expansion Coefficient $10^6$ in./in. °F. |
|---|---|---|
| 80 | 42.69 | 1.38 |
| 1346 | 41.48 | 2.27 |
| 1652 | 41.19 | 2.49 |

Typical Properties Of $Si_3N_4$:

| | Hot Pressed | Sintered |
|---|---|---|
| Bulk Density (g/cm³) | 3.26 | 3.2 |
| Thermal Conductivity (cal/s. cm. °C.) | 0.07 | 0.035 |
| Specific Heat (cal/g. °C.) | 0.17 | 0.17 |
| Flexual Strength (kg/mm²) | 120 | 85 |
| Compressive Strength (kg/mm²) | 450 | 400 |
| Thermal Expansion Coefficient ($\times 10^{-6}$/°C.) | 3.2 | 2.8 |
| Young's Modulus ($10^4$ kg/mm²) | 3.2 | 2.8 |
| Max Usable Temperature (°C.) | 1600 | 1200 |
| Normal Usable Temperature (°C.) | 1200 | 1000 |

Composition:

| | |
|---|---|
| (X-ray fluorescence - no standards available) | $Y_2O_3 \leq 5$ wt % |
| | $TiO_2 \leq 0.24$ wt % |
| | $Al_2O_3 \leq 8$ wt % |
| | $Si \sim 46$ wt % |
| | $Fe_2O_3 \leq 0.008$ wt % |
| | Balance . . . N |

A slurry coating of a refractory material, preferably, a mixture of nickel and molybdenum silicide (Ni-MoSi$_2$) powder, is melted on to one or more surfaces or portions thereof, of the $Si_3N_4$, and bonded thereto at a temperature of about 1350° C. to about 1600° C., preferably about 1500° C., in a vacuum. If necessary, the metallic coated surface or surfaces or portion or portions thereof, are then ground to get a uniform thickness of the metallic coating. The metallic coated surface or surfaces or portion or portions thereof are then metallurgically bonded to another hard metal such as iron, brass, stainless steel, copper, and the like, preferably stainless steel, still more preferably, Greek Ascaloy, utilizing a brazing alloy. As used herein, a surface of the ceramic material is meant to include, without limitation, a single surface or a plurality of surfaces, or portion or portions of a single or plurality of surfaces. Greek Ascaloy was the metal of choice due to its desirable high temperature properties. Exemplary brazing alloys suitable for the metallurgical bonding include but are not limited to nickel-copper-silver (Ni-Cu-Ag or Nicusil 8), nickel-copper-manganese (Ni-Cu-Mn or Nicuman 37), nickel-copper-palladium (Ni-Cu-Pd), palladium-copper-silver (Pd-Cu-Ag or Palcusil 10), titanium-copper-nickel (Ti-Cu-Ni or Ticuni) and the like. Nickel-copper-silver (Ni-Cu-Ag or Nicusil 8) and nickel-copper-manganese (Ni-Cu-Mn or Nicuman 37) are preferred, nickel-copper-silver being the most preferred.

The following examples best serve to illustrate the principle of the subject invention and describe preferred embodiments thereof and are not to be construed as limiting the invention in any manner or to any precise form:

EXAMPLE 1

Evaluation Of Materials

Two centerless ground solid cylinders 3 cm in diameter and 6 cm long, of $Si_3N_4$ was a product of Toshiba Ceramics. The properties of the $Si_3N_4$ material are shown in Table 1. Approximately 0.3 cm thick wafers were cut off from one end of these cylinders. The cut surfaces were polished with 1-$\mu$m diamond before bonding. One long bar, 3.5 cm in diameter and 25 cm in length, of Greek Ascaloy steel was supplied by Cummins Engine Company, Inc. The composition and properties of this alloy are presented in Table 2. Approximately 0.6 cm thick wafers were cut from this bar and the cut surfaces polished with 1-$\mu$m diamond before bonding to $Si_3N_4$.

EXAMPLE 2

Bonding Conditions For Stainless Steel (Greek Ascaloy)

Pressure bonding (1000 psi) of two Greek Ascaloy wafers together with a thin ($\sim$20 $\mu$m thick) slurry layer of $MoSi_2$ powder was demonstrated at 1000° C. Although a good bond was observed, the microstructure of the steel was significantly altered during the $\frac{1}{2}$ hour pressure bonding treatment. Microhardness across the bonded region did not indicate any significant difference in hardness or the development of a brittle interface at the bonded regions. The general hardness of the steel increased from about 312 to 521 $DPH_{500}$ as expected, due to the high temperature used to achieve this bond. Pressure bonds with the $MoSi_2$ layer attempted below 800° C. were not very successful. The lowest temperature at which a pressure bond was formed was found to be about 860° C. The microstructure of the steel was not changed and the microhardness changed only slightly.

EXAMPLE 3

Bonding Conditions For $Si_3N_4$

Initial attempts to bond $Si_3N_4$ to Greek Ascaloy at 860° C. with an intermediate slurry layer of $MoSi_2$ were not very successful. The thermal expansion mismatch between the two materials sheared the relatively weak bond between the steel and $MoSi_2$. The $MoSi_2$ layer was previously bonded to the $Si_3N_4$ at 1400° C. in vacuum. To reduce this expansion mismatch and develop a metallic layer on the $Si_3N_4$ that could be vacuum brazed to the steel, a Ni/$MoSi_2$ slurry coating was prepared and bonded to the $Si_3N_4$ at 1400° C. in vacuum. Slurries of Ni and $MoSi_2$ powders as well as Ni, Mo, and Si powders were evaluated (see Table I). Both slurry coatings produced enough wetting of the $Si_3N_4$ surface to get a metallic layer for subsequent vacuum brazing to steel. The bond at the interface was excellent. A 1:1 weight ratio rather than 1:2 weight ratio of Ni or $MoSi_2$ resulted in a significant improvement in the wetting properties of the Ni/$MoSi_2$ slurry. Complete wetting of the $Si_3N_4$ surface preparation was achieved when the surfaces were preheated in air at 1000° C. Surface oxidation of a freshly ground surface of $Si_3N_4$ surface at 1000° C. in air for 10, 15, and 20 minutes increased wetting progressively. Excessive oxidation of the $Si_3N_4$ surface caused spalling and nonuniform wetting of the Ni/$MoSi_2$ slurries in subsequent treatments. Optimum wetting occurred with the slurry coatings when the $Si_3N_4$ was oxidized at 1000° C. in air for 20 minutes.

These metallized surfaces were polished to remove any excessive lumps before slurry-coating with a thin layer ($\sim$300 $\mu$m at full density) of braze powder mixed with acetone (3:1 volume ratio respectively). The polished faces of the steel wafers were placed over these slurry coatings of Nicusil 8 and Nicuman 37 and vacuum brazed for 15 min at 900° and 950° C. respectively. Both wafer sandwiches were intact after vacuum brazing. Metallographic examination of the Nicusil 8 bonded layer disclosed nearly continuous bonding with only isolated regions of fractured material. These latter regions of a different composition were very brittle and could not withstand the stresses generated by the thermal mismatch of the $Si_3N_4$ and steel during cool down. Closer examination of these two regions showed significant differences in their microstructure, bonding characteristics, composition, and microhardness. The brittle and undesirable region was high in Ni, Mo, Si and Cu, by electron microprobe mapping. In comparison, a large portion of the bonded region was high in only Ni, Cu, and Ag. A uniform dispersion of other elements such as Al, Si, Fe, Cr, Ti, and Mo was also detected by microprobe mapping across the major braze regions. Similar uniform distribution of elements like Al, Fe, Si and Ti, was detected in the brittle second-phase regions. Diffusion of Ni, Cu, and Mo into the $Si_3N_4$ was detected at all points along the interface. Diffusion of Al and Ti from the $Si_3N_4$ into the braze regions was also detected. Extensive diffusion of elements like Ni, Si, Cu, Al and Ag also occurred across the interface of Nicusil 8 to steel.

The Knoop microhardness along each interface was determined at 200- or 500-gm loading and parallel to the interfaces. The brittle second-phase regions with microcracks had significantly high hardness in comparison with the rest of the braze regions ($\sim$900 vs. $\sim$100 $H_{k200}$).

Microprobe evaluation of the Nicuman 37 brazed wafers was performed across selected sections. Mn and Mo were uniformly dispersed in the braze region while Ti was uniformly detected in the $Si_3N_4$ and the immediate braze layer.

These microprobe results suggested the possibility of bonding this $Si_3N_4$ directly to the steel without using the premetallizing coating of Ni/$MoSi_2$ on the $Si_3N_4$ before brazing. A $Si_3N_4$ wafer with a preoxidized surface was brazed directly to a steel wafer with the Nicusil 8 braze at 900° C. for 15 min in vacuum. This bond was weak which indicated the need for the premetallizing coating of Ni/$MoSi_2$ on the $Si_3N_4$ before brazing.

The $Si_3N_4$ rotor and steel shaft were bonded with Nicusil 8 after preoxidizing and metallizing the $Si_3N_4$ bonding surface with Ni/$MoSi_2$. The rotor was heat-treated in air for 20 min at 1000° C. to oxidize the $Si_3N_4$ joint surface. The slurry coat of Ni/$MoSi_2$ (1:1 by weight) was applied to the $Si_3N_4$ bonding surface and heat treated in vacuum for 20 min at 1500° C. This metallized surface was ground smooth with a diamond tool and coated with the Nicusil 8 braze slurry. The steel shaft was heated to 300° C. and slipped over the Si$_3$N$_4$ rotor. This assembly was placed in a vacuum furnace and heat-treated to 900° C. for 20 min to complete the bond.

The silicon nitride-stainless steel junction comprising the multilayered composite of the subject invention is useful for the fabrication of thin rotor blades for air compressor, turbine and diesel engines and for other similar applications. The interface bond is strong but ductile and deforms under loads to accommodate stresses. The subject composites may also be useful for the fabrication of other machine parts and tools where the heat and corrosion resistance of ceramics and the strength, durability and workability of a metal, particularly a structural metal are desired or required. The present composites withstand strong mechanical and thermal shocks and stresses and are able to undergo thermal cycling without breakdown of the bond structure and properties. The two-stage method of the subject invention uses lower bonding temperatures than prior methods, thus allowing diffusion of the refractory materials into the ceramic and metal components without overheating the metal. It thus overcomes the temperature-expansion restrictions imposed by previous techniques. The ceramic-metal bond is a multilayered structure built in two steps to maintain the properties of the steel. The ceramic-metal junction or interface, prepared in accordance with the present method, withstands corrosive environments and temperature cycling, and the shear forces generated by the heating and cooling processes encountered in turbine, air compressor and diesel engines.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A multilayered composite comprising:
   a layer of high density, sintered silicon nitride;
   a layer of a refractory material comprising a mixture of powdered nickel and molybdenum silicide;
   a layer of a brazing alloy; and
   a layer of metal, with said layer of a brazing alloy sandwiched between said layer of metal and said layer of refractory material.

2. The composite of claim 1, wherein said brazing alloy is selected from the group consisting of nickel-copper-silver, nickel-copper-manganese, nickel-copper-gold, nickel-copper-palladium alloys.

3. The composite of claim 2, wherein said brazing alloy is nickel-copper-silver or nickel-copper-manganese.

4. The composite of claim 3, wherein the metal is selected from the group consisting of iron, steel, stainless steel, nickel, tungsten, copper, brass, titanium, platinum, and zirconium.

5. The composite of claim 4, wherein the metal is stainless steel.

6. The composite of claim 5, wherein said stainless steel is Greek Ascaloy.

7. A multilayered composite comprising:
   a layer of high density, sintered silicon nitride;
   a layer of a refractory material comprising a mixture of powdered molybdenum silicide and nickel, slurry coated onto a surface of said silicon nitride and bonded at about 1500° C. in a vacuum;
   a layer of a brazing alloy comprising nickel-copper-silver or nickel-copper-manganese alloy; and
   a layer of stainless steel, with said layer of said brazing alloy sandwiched between and bonded in a vacuum to said layer of stainless steel and said layer of said refractory material at a temperature in the range of about 850° to 950° C.

8. The composite of claim 7, wherein any of said layers is a plurality of layers.

9. The composite of claim 7, wherein said stainless steel is Greek Ascaloy.

10. The composite of claim 9, wherein said brazing alloy is nickel-copper-silver alloy.

11. A silicon nitride rotor and steel shaft for a turbine or air compressor or diesel engine bonded together by the method comprising:
   (a) polishing a surface of a dense, sintered silicon nitride rotor to enhance wetting of said surface;
   (b) slurry coating and bonding to said surface of said silicon nitride rotor, a layer of a refractory material comprising a mixture of powdered nickel and molybdenum silicide;
   (c) grinding said layer of said refractory material to uniform thickness;
   (d) brazing said layer of said refractory material with a nickel-copper-silver or nickel-copper-manganese alloy at elevated temperatures; and
   (e) pressure bonding a steel shaft to said refractory material and said alloy.

12. A silicon nitride rotor and steel shaft junction for a turbine or diesel or air compressor engine said junction comprising a multilayer composite according to claim 10.

* * * * *